United States Patent
Barreto et al.

(10) Patent No.: US 12,180,417 B2
(45) Date of Patent: Dec. 31, 2024

(54) COMPOSITION THAT CAN BE USED TO DELAY THE FORMATION OF GAS HYDRATES

(71) Applicant: Arkema France, Colombes (FR)

(72) Inventors: Gilles Barreto, Messimy (FR); Henry Delroisse, Lyons (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 17/288,775

(22) PCT Filed: Oct. 28, 2019

(86) PCT No.: PCT/FR2019/052562
§ 371 (c)(1),
(2) Date: Apr. 26, 2021

(87) PCT Pub. No.: WO2020/089554
PCT Pub. Date: May 7, 2020

(65) Prior Publication Data
US 2021/0403795 A1  Dec. 30, 2021

(30) Foreign Application Priority Data
Oct. 31, 2018 (FR) ...................................... 1860083

(51) Int. Cl.
C09K 8/52 (2006.01)
C09K 8/035 (2006.01)

(52) U.S. Cl.
CPC ............... *C09K 8/52* (2013.01); *C09K 8/035* (2013.01); *C09K 2208/22* (2013.01)

(58) Field of Classification Search
CPC ...... C09K 8/52; C09K 2208/22; C09K 8/524; C08L 39/04
See application file for complete search history.

(56) References Cited

U.S. PATENT DOCUMENTS

| 4,820,771 | A | 4/1989 | Muessig et al. |
| 5,331,105 | A | 7/1994 | Duncum et al. |
| 6,451,892 | B1* | 9/2002 | Bakeev ................. C08K 5/053 526/264 |
| 2014/0251610 | A1* | 9/2014 | Brannon ................. C09K 8/68 166/280.1 |
| 2017/0321050 | A1 | 11/2017 | Elanany et al. |
| 2017/0321108 | A1 | 11/2017 | Majnouni et al. |
| 2018/0179361 | A1* | 6/2018 | Xue ....................... C08L 77/06 |

FOREIGN PATENT DOCUMENTS

| CN | 104357034 A | 2/2015 | |
| CN | 106190060 A | 12/2016 | |
| WO | WO-9604348 A1 * | 2/1996 | ............. C09K 8/035 |
| WO | 2011117660 A2 | 9/2011 | |
| WO | 2013/060679 A1 | 5/2013 | |
| WO | 2016202677 A1 | 12/2016 | |
| WO | WO-2016202577 A1 * | 12/2016 | ............. C08K 3/013 |
| WO | 2019185490 A1 | 10/2019 | |

OTHER PUBLICATIONS

International Search Report and Written Opinion for International Application No. PCT/FR2019/052562, dated Feb. 3, 2020, 7 pages.
Office Action issued by the U.S. Patent and Trademark Office in the U.S. Appl. No. 18/123,012, mailed Feb. 29, 2024, U.S. Patent and Trademark Office, Alexandria, VA. (12 pages).
Non Final Office Action for U.S. Appl. No. 18/123,012, mailed Nov. 8, 2023, 20 pages.
Egyptian Technical Report for Egyptian Application No. 2021040638, issued Jan. 3, 2024, 3 pages.

* cited by examiner

*Primary Examiner* — Kumar R Bhushan
(74) *Attorney, Agent, or Firm* — Buchanan Ingersoll & Rooney PC

(57) ABSTRACT

The present invention relates to a composition comprising: at least one co-polymer of which at least one of the repeating units comprises at least one amide function; and at least one polyether having a molecular weight ($M_W$) greater than 60 g·mol$^{-1}$. The invention also relates to the use of said composition for delaying, or even preventing, the formation of gas hydrates, in particular in a method for extracting oil and/or gas and/or condensates, as well as to the method for delaying, or even preventing, the formation and/or agglomeration of gas hydrates, using a composition as defined above.

10 Claims, No Drawings

COMPOSITION THAT CAN BE USED TO DELAY THE FORMATION OF GAS HYDRATES

CROSS-REFERENCE TO RELATED APPLICATIONS

This is the national phase of International Application No. PCT/FR2019/052562, filed 28 Oct. 2019, which claims priority to French Application No. 1860083, filed 31 Oct. 2018. The disclosure of each of these applications is incorporated herein by reference in its entirety for all purposes.

FIELD OF THE INVENTION

The present invention relates to the field of the extraction of hydrocarbons and more particularly to the field of the additives used to facilitate the extraction and the transportation of said hydrocarbons towards the surface. The present invention relates very particularly to a process for inhibiting the formation of gas hydrates which are commonly known to disrupt the flow of hydrocarbons in the pipes for extraction and transportation of said hydrocarbons.

BACKGROUND OF THE INVENTION

The extraction of hydrocarbons, mainly oil, gas, condensates and others, is today carried out in very diverse environments and in particular in offshore sites, underwater sites or else in sites experiencing cold weather periods. These diverse environments can often result in significant cooling of the extracted fluids in contact with the cold walls of the transportation pipes.

Extracted fluids (or produced fluids or production fluids) is understood to mean the fluids comprising oil, gases, condensates, water and mixtures thereof. Oil is understood to mean, within the meaning of the present invention, crude oil, that is to say unrefined oil, originating from a deposit.

Gases is understood to mean, within the meaning of the present invention, crude natural gases, that is to say untreated gases, extracted directly from a deposit, such as, for example, hydrocarbons, such as methane, ethane, propane or butane, hydrogen sulfide, carbon dioxide and other compounds which are gaseous under the extraction conditions, and also the mixtures thereof. The composition of the extracted natural gas varies considerably depending on the wells. Thus, the gas may comprise gaseous hydrocarbons, water and other gases.

For the purposes of the present invention, the term "condensates" means hydrocarbons of intermediate density. Condensates generally comprise mixtures of hydrocarbons which are liquid under the extraction conditions.

It is known that these production fluids usually include an aqueous phase, in a greater or lesser amount. The origin of this aqueous phase may be endogenous and/or exogenous to the underground reservoir containing the hydrocarbons, the exogenous aqueous phase generally originating from injection of water, also known as "injection water".

The depletion of the sites discovered in the past is often nowadays leading the oil and gas industry to extract, in particular on new sites, from increasingly great depths, on offshore sites and with ever more extreme weather conditions.

On offshore sites in particular, the pipes for transportation of the fluids produced are often positioned on the seabed, at ever greater depths, where the temperature of the seawater is often less than 15° C., more often less than 10° C., indeed even close to or equal to 4° C.

Similarly, it is common to find extraction sites located in geographical regions where the air and/or the surface water can be at relatively cold temperatures, typically below 15° C., indeed even below 10° C. In point of fact, at such temperatures, the produced fluids undergo significant cooling during their transportation. This cooling can be further magnified in the case of a shutdown or a slowdown in production, in which cases the contact time between the produced fluids and the cold walls of the pipe can increase, often considerably.

One of the disadvantages directly related to a more or less sudden lowering of the temperatures of the produced fluids is the formation of clathrates, also known as hydrate crystals, gas hydrates or more simply hydrates. The risk of formation of such hydrates in production fluids and in particular during oil, gas and condensate extraction is proportionately greater the lower the temperature of the production fluids and the higher the pressure of these fluids.

These clathrates are solid crystals (similar to those of water in the ice form) formed by water molecules, also called "hosts", around one or more gas molecules, also called "guests", such as methane, ethane, propane, butane, carbon dioxide or hydrogen sulfide.

The formation and growth of these crystals are usually induced by a drop in the temperature of the production fluids which exit hot from the geological reservoirs which contain them and which enter a cold region. These crystals can grow more or less rapidly and agglomerate and can cause pluggings or blockages of the production pipes, of the pipes for transportation of the hydrocarbons (oil, condensates, gas), of the gates, valves and other elements liable to be completely or at least partially blocked.

These pluggings/blockages can lead to losses in production of oil, condensates and/or gas, resulting in significant, indeed even very substantial, economic losses. This is because these pluggings and/or blockages will have the consequence of a decrease in the production output, indeed even a shutdown of the production unit. In the event of blockage, the search for the region of the blockage and its removal will result in a loss of time and of profit for this unit. These pluggings and/or blockages can also lead to malfunctions with regard to safety elements (for example safety valves).

These problems of formation and/or agglomeration of hydrates can also be encountered in drilling muds or in completion fluids, during a drilling operation or a completion operation.

Various solutions have already been proposed or envisaged to reduce, delay or inhibit the formation and/or agglomeration of hydrates. Mention may in particular be made, among these, of a first solution which consists in dehydrating the production fluid, crude oil or gas, upstream of the region of the pipe where the temperature promotes the formation of said hydrates. However, this solution is difficult, indeed even impossible, to implement under satisfactory economic conditions.

A second approach, which is also very expensive, consists in maintaining the temperature of the pipe at a temperature greater than the temperature of formation and/or agglomeration of the hydrates, at a given pressure.

A third approach, which is frequently used, consists in adding an additive denoted "thermodynamic hydrate inhibitor" (THI), generally an alcohol or alcohol derivative, for example methanol, or glycol, to the fluids produced containing the water/guest gas(es) mixture. It is nowadays commonly recognized that the addition of such an additive makes it possible to shift the thermodynamic equilibrium temperature for formation of the hydrates. In order to obtain an acceptable effectiveness, approximately 30% by weight of alcohol, with respect to the amount of water, is generally introduced. However, the toxicity of the alcohols or alcohol derivatives and the large amount of additive used are increasingly leading industrialists to adopt a fourth approach.

This fourth solution consists in adding an additive at low dosage, known as low dosage hydrate inhibitor (LDHI), to the fluids produced comprising the water/guest gas(es) mixture. This additive is also known as hydrate inhibitor and is introduced at a low dosage, generally of between 1% and 4% by weight, with respect to the weight of the water, it being understood that greater or smaller amounts are, of course, possible. Two types of hydrate-inhibiting additives are currently known: anti-agglomerants and kinetic hydrate inhibitors.

As indicated above, the formation of hydrates depends mainly on the temperature and the pressure, and also on the composition of the guest gas or gases. In order to be able to compare the performance of the additives, use is made of the notion of "sub-cooling" (SC). Sub-cooling is thus defined by the difference between the thermodynamic equilibrium temperature for formation of the hydrate crystals ($T_{eq}$), for a given pressure and a given composition of the hydrate-forming gases and of the aqueous phase, and the temperature of the fluids produced (or extraction temperature T), according to the following equation: $SC=T_{eq}-T$.

When the sub-cooling is greater than or equal to 0° C., there is a risk of formation of gas hydrate and this risk increases as the sub-cooling increases.

Anti-agglomerants are not inhibitors of the formation of hydrate crystals but have the property of dispersing them, which consequently prevents said hydrate crystals from agglomerating together. The hydrate crystals, thus dispersed, can no longer plug the pipelines for transportation of the oil and gas production fluids, thus increasing the production, in particular the extraction of oil and gas.

Anti-agglomerants retain their effectiveness even at low temperature. They make it possible in particular to prevent problems of blockage of the pipes at temperatures generally of 15° C. below the minimum temperature at which the hydrate crystals form, for a given pressure.

Kinetic hydrate inhibitors, for their part, act on the germination and the growth of the hydrate crystals, delaying by several hours, indeed even by several days, the formation of the crystals. However, in contrast to anti-agglomerants, kinetic hydrate inhibitors operate with difficulty at large sub-coolings. This is because, at temperatures of more than 10° C. below the minimum temperature at which the hydrate crystals form for a given pressure (SC≥10° C.), the effectiveness of the kinetic hydrate inhibitors is reduced.

In other words, at these sub-cooling levels, the time for appearance of the crystals is sufficiently short for them to appear, thus increasing the pressure loss in the pipes for transportation of the oil and gas production fluids.

The document CN104357034 discloses a mixture of two homopolymers (poly(vinylpyrrolidone) and poly(vinylcaprolactam)) associated with propylene glycol. This mixture exhibits kinetic hydrate inhibitor properties. However, a relatively significant foaming of this mixture is observed under the conditions of use. In addition, the polymers of this mixture result in a cloud point at a relatively low temperature, which can in particular prove to be insufficient during injections under hot conditions.

There consequently remains a real need to develop additives which make it possible to delay the formation of hydrates (kinetic hydrate inhibitors), which are even more effective and in particular which make it possible to operate at sub-coolings of greater than 10° C., better still of greater than 12° C., more advantageously of greater than 13° C., more preferably of greater than 15° C. In other words, there remains a real need for kinetic hydrate inhibitors which exhibit induction times (times for formation of the hydrates) which are as long as possible.

SUMMARY OF THE INVENTION

Another objective of the present invention consists in providing a kinetic hydrate inhibitor which is effective under the normal conditions of use, that is to say for a dosage typically of between 0.1% and 10% by weight, with respect to the total weight of the aqueous phase in a production fluid. Yet another objective is to provide a kinetic hydrate inhibitor which is not very toxic to the environment but also not very expensive and easy to produce.

Another objective of the invention is to provide a kinetic hydrate inhibitor with a higher cloud point than those known from the prior art. Yet another objective is to provide a kinetic hydrate inhibitor which produces only slight foaming or foaming which is at least substantially reduced, with respect to that observed with the hydrate inhibitors of the prior art.

It has now been discovered, surprisingly, that compositions comprising mixtures of specific polymers make it possible to completely or at least partially satisfy the above-mentioned objectives, and in particular make it possible to behave as kinetic hydrate inhibitors exhibiting relatively long induction times, and in particular longer induction times than those observed with the known kinetic hydrate inhibitors of the prior art, this being the case for relatively great sub-coolings. These polymer compositions are in addition shown to be environmentally friendly and easy to prepare with entirely reasonable production costs.

Other objectives, characteristics, aspects and advantages of the invention will become even more clearly apparent on reading the description and examples which follow. In that which follows and unless otherwise indicated, the limits of a range of values are included in this range, in particular in the expressions "of between . . . and . . . " and "ranging from . . . to . . . ".

Thus, and according to a first aspect, the present invention relates to a composition comprising:
  a) at least one copolymer, at least one of the repeat units of which comprises at least one amide functional group,
  b) at least one polyether with a weight-average molecular weight (Mw) of greater than 60 g·mol$^{-1}$, preferably of greater than 100 g·mol$^{-1}$, and
  c) optionally, but preferably, at least one organic solvent.

The copolymer, at least one of the repeat units of which comprises at least one amide functional group, is a copolymer, the amide functional groups of which are branched on the polymer chain ("pendant" amide functional groups). The nitrogen atoms of said amide functional groups can be substituted, and are preferably substituted, more preferably monosubstituted, more preferentially disubstituted. The substituents are identical or different and are, independently of one another, chosen from the hydrogen atom and aliphatic groups comprising from 1 to 30 carbon atoms, preferably from 1 to 8 carbon atoms, more preferably from 1 to 4 carbon atoms, and optionally comprise 1, 2, 3 or 4, preferably 1 or 2, heteroatoms, independently chosen from oxygen, nitrogen and sulfur.

The substituents of the disubstituted amide functional groups can also, and according to another embodiment of the present invention, form a hydrocarbon or heterohydrocarbon ring comprising from 4 to 7 carbon atoms and optionally comprising 1, 2, 3 or 4, preferably 1 or 2, heteroatoms independently chosen from oxygen, nitrogen and sulfur, preferably with a maximum of two heteroatoms in the ring, it being possible for the ring itself to be substituted by one or more saturated, linear or branched, alkyl chains comprising one or more heteroatoms chosen, independently of one another, from oxygen, nitrogen and sulfur, or a combination of these groups with the heterohydrocarbon ring comprising from 4 to 7 carbon atoms. Such monomers are, for example, described in detail in Patent Applications US2017321050 and US2017321108.

According to another embodiment of the present invention, when the nitrogen atoms of the pendant amide functional groups are disubstituted, the two substituents can form, together and with the nitrogen atom which bears them, a ring and can optionally form a lactam with the amide sequence.

The substituents of the nitrogen atoms of the pendant amide functional groups can also comprise one or more nitrogen atom(s), preferably one nitrogen atom. This or these substituent nitrogen atom(s) of the nitrogen atoms of the pendant amide functional groups may also have reacted with one or more alkylating agent(s), so as to form an ammonium cation, it being possible for the anion to be chosen from all the anions known to a person skilled in the art and in particular from halides (for example chloride or bromide), sulfonates (for example methanesulfonate or para-toluenesulfonate), sulfates (for example methyl sulfate or ethyl sulfate), carbonates (for example methyl carbonate), and others.

Copolymer is understood to mean, in this invention, a polymer resulting from the polymerization of two, three or more different monomers. In particular, terpolymer is understood to mean, in the present invention, a polymer resulting from the polymerization of three different monomers.

The copolymers which can be used in the context of the present invention can be block or graft, random, periodic or statistical copolymers, preferably of low molecular weight. Low molecular weight is understood to mean a weight of between 1000 and 5000 atomic mass units (amu) and preferably between 1500 and 4000 amu.

According to yet another embodiment of the invention, the monomers which can be used to form the copolymers with monomers having an amide functional group can be chosen from monomers comprising an amine functional group. These amine functional groups can be primary ($-NH_2$), secondary ($-NHR_a$) or tertiary ($-NR_aR_b$) amines, preferably secondary or tertiary amines. The substituent $R_a$ and $R_b$ radicals of the secondary or tertiary amines can be identical or different and be chosen, independently of each other, from saturated or partially unsaturated, linear or branched, hydrocarbon chains comprising from 1 to 30 carbon atoms, preferably from 1 to 20 carbon atoms, more preferably from 1 to 8 carbon atoms.

The $R_a$ and $R_b$ radicals can optionally, and with the nitrogen atom which bears them, form a heterohydrocarbon ring comprising from 3 to 8, preferably from 4 to 7, ring members with optionally 1, 2, 3 or 4 heteroatoms independently chosen from oxygen, nitrogen and sulfur, preferably with a maximum of 2 heteroatoms in the ring, it being possible for the ring to be substituted by one or more entities chosen from saturated or partially unsaturated, linear or branched, hydrocarbon chains and from heteroatoms independently chosen from oxygen, nitrogen and sulfur. Such monomers are in particular described in detail in the publications of Patent Applications US2017321050 and US2017321108.

The $R_a$ and $R_b$ substituents of the nitrogen atoms of the abovementioned pendant amine functional groups can also comprise one or more nitrogen atom(s), preferably one (1) nitrogen atom. This or these substituent nitrogen atom(s) of the nitrogen atoms of the pendant amine functional groups may also have reacted with one or more alkylating agent(s), so as to form an ammonium cation, it being possible for the anion to be of any type well known to a person skilled in the art and preferably chosen from halides (for example chloride or bromide), sulfonates (for example methanesulfonate or para-toluenesulfonate), sulfates (for example methyl sulfate or ethyl sulfate), carbonates (for example methyl carbonate), and others.

According to one embodiment of the invention, the monomer or monomers which can be used to form the copolymers clarified above can be of any type and are advantageously chosen from the monomers of formula (I):

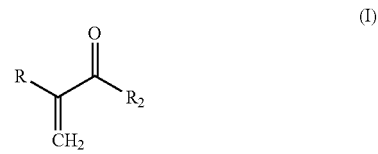

(I)

wherein:
R represents $-H$ or $-CH_3$, and
$R_2$ is chosen from the hydrogen atom and an alkyl, alkoxy, hydroxy, N-alkylaminoalkoxy, N,N-dialkylaminoalkoxy, hydroxyalkoxy radical, saturated or partially or completely unsaturated cyclic radical comprising from 3 to 8 ring members, preferably 4 to 7 ring members, and optionally one or more identical or different heteroatoms which are chosen from oxygen, nitrogen and sulfur and which are optionally substituted by one or more groups chosen from alkyl, halogen, carbonyl, hydroxy, alkoxy, amino, nitro and cyano.

The monomers of formula (I) can, for example and nonlimitingly, be chosen from acrylic acid, alkyl acrylates, N-alkylaminoalkyl acrylates and N,N-dialkylaminoalkyl acrylates, and also their corresponding quaternary alkyl halides, in particular chlorides, hydroxyalkyl acrylates, methacrylic acid, alkyl methacrylates, N-alkylaminoalkyl methacrylates and N,N-dialkylaminoalkyl methacrylates, and also their corresponding quaternary alkyl halides, in particular chlorides, hydroxyalkyl methacrylates, and others, and also the mixtures of two or more of them in all proportions.

DETAILED DESCRIPTION OF THE INVENTION

In the present description, the term "alkyl" represents, unless otherwise indicated, a saturated, linear or branched, hydrocarbon radical comprising from 1 to 10 carbon atoms, preferably from 1 to 6 carbon atoms, more preferably from 1 to 4 carbon atoms.

Yet other monomers can participate in the formation of the abovementioned copolymers and, among these, mention may be made, without, however, being limiting, of monomers containing at least one hydroxyl functional group and/or at least one functional group which can be converted into a hydroxyl functional group. Such monomers are in particular described in detail in International Application WO2010117660. Mention may very particularly be made, among these monomers, of vinyl acetate.

In the composition according to the present invention, the copolymer, at least one of the repeat units of which comprises at least one amide functional group, is a copolymer obtained by polymerization of at least one monomer comprising a pendant amide functional group, and preferably the copolymer is a copolymer obtained by polymerization of two or more monomers comprising a pendant amide functional group, for example chosen from substituted or unsubstituted (meth)acrylamides, vinyl monomers having lactam groups, in particular vinylpyrrolidones or vinylcaprolactams.

According to a preferred embodiment of the present invention, the monomers used for the preparation of the copolymer, at least one of the repeat units of which comprises at least one amide functional group (copolymer a) of the composition of the present invention), are chosen from the monomers of vinylcaprolactam (VCap) type and of vinylpyrrolidone (VP) type.

Copolymers resulting from the copolymerization of at least one vinyl monomer having amide groups and/or cyclic amide groups (lactams) with a monomer containing a hydroxyl functional group and/or a functional group which can be converted into a hydroxyl functional group is understood to mean the copolymers resulting, for example, from the polymerization of the monomers of the type of vinylpyrrolidones (VP), vinylcaprolactams (VCap), acrylamides and/or methacrylamides with monomers containing a hydroxyl functional group and/or a functional group which can be converted into a hydroxyl functional group and in particular the monomers described thus in detail in International Application WO2010117660.

According to one embodiment of the present invention, the copolymers are obtained by copolymerization of vinylcaprolactam (VCap) and/or vinylpyrrolidone (VP) with vinyl acetate and more preferably by copolymerization of vinylcaprolactam (VCap) with vinyl acetate. These copolymers are known and are commercially available or are easily prepared from known procedures described in the scientific literature, on the Internet or in patent applications, for example in the abovementioned document WO2010117660.

More particularly, nonlimiting examples of the abovementioned monomers are vinylpyrrolidone (VP), vinylcaprolactam (VCap), acrylamide, methacrylamide, N-alkylacrylamide, N-alkylmethacrylamide, N,N-dialkylacrylamide, N,N-dialkylmethacrylamide, N,N-dialkylaminoalkylacrylamide, N,N-dialkylaminoalkylmethacrylamide, and also the quaternary alkylammonium salts (halides, sulfonates, sulfates, carbonates and others) thereof.

According to one embodiment of the invention, the copolymer a) is a copolymer obtained by copolymerization of monomers of vinylcaprolactam (VCap) type and of vinylpyrrolidone (VP) type. For example, when the monomer of vinylcaprolactam (VCap) type is copolymerized in the presence of a monomer of vinylpyrrolidone (VP) type, the VCap/VP ratio by weight is advantageously of between 95/5 and 30/70, preferably between 75/25 and 50/50 and more preferably still between 60/40 and 50/50.

According to another preferred embodiment of this invention, the copolymer a) of the composition according to the present invention is a VCap/VOH copolymer obtained by polymerization of N-vinyl-2-caprolactam and vinyl acetate. This copolymerization is advantageously carried out in an appropriate solvent known to a person skilled in the art (for example butyl glycol), followed by hydrolysis of the polymer in an alkaline medium. The VCap/VOH ratio by weight in the final copolymer is of between 30/70 and 95/5, preferably between 60/40 and 85/15 and more preferably still between 65/35 and 75/25. Mention may be made, for example, among the copolymers of interest for this invention, of the product sold by Ashland Inc. under the trade name Inhibex BIO 800.

The total amount of the copolymer or copolymers a) present in the composition of the invention is preferably of between 1% and 50% by weight, more preferably between 5% and 40% by weight and better still between 10% and 30% by weight, with respect to the total weight of the composition.

As indicated above, the polyether b) of the composition according to the invention exhibits a weight-average molecular weight (Mw) of greater than 60 g·mol$^{-1}$, more preferably of greater than 100 g·mol$^{-1}$. In a preferred embodiment, the polyether b) of the composition according to the invention has a weight-average molecular weight (Mw) of greater than 60 g·mol$^{-1}$, more preferably of greater than 100 g·mol$^{-1}$, more particularly of greater than 160 g·mol$^{-1}$, better still of greater than 200 g·mol$^{-1}$, and very particularly of greater than 260 g·mol$^{-1}$, limits included.

For the purposes of the present invention, it should be understood that said polyether b) may be of any type known to those skilled in the art, optionally functionalized, and in particular a linear polyether, a branched polyether or even a star or hyperbranched polyether. The present invention also encompasses polyethers of "comb" polyether type or of dendrimer type. A family of such polyethers is described for example in Application WO2019185490.

According to one embodiment, the polyether b) is a polyether comprising the following unit z):

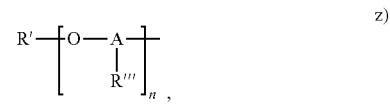

wherein,
R' and R''', which are identical or different, are chosen, independently of each another, from:
the hydrogen atom,
a saturated or partially or completely unsaturated, linear, branched or cyclic, hydrocarbon chain comprising from 1 to 30 carbon atoms, preferably from 1 to 20 carbon atoms, more preferably from 1 to 10, more preferentially from 1 to 6, better still from 1 to 5 carbon atoms, limits included, optionally interrupted by one or more, and preferably one, oxygen atom(s), and optionally substituted by one or more radicals chosen from —SR$_3$, —SOR$_3$, —SO$_2$R$_3$, —SO$_3$R$_3$, —S$^+$O$_3$X$^-$, —S$^+$R$_3$R$_4$X$^-$, —P(=O)R$_5$R$_6$, —OR$_7$, —C(=O)R$_7$, and —C(=O)OR$_7$,
R$_7$, R$_3$ and R$_4$, which are identical or different, represent, independently of each other, the hydrogen atom and a saturated or partially or completely unsaturated, linear, branched or cyclic, hydrocarbon chain comprising from 1 to 30 carbon atoms, preferably from 1 to 20, more preferably from 1 to 10, more preferentially from 1 to 6, better still from 1 to 5 carbon atoms, limits included, optionally interrupted by one or more oxygen atom(s), $R_5$ and $R_6$, which are identical or different, represent, independently of each other, the hydrogen atom, an —$OR_3$ radical, or a saturated or partially or completely unsaturated, linear, branched or cyclic, hydrocarbon chain comprising from 1 to 30 carbon atoms, preferably from 1 to 20, more preferably from 1 to 10 carbon atoms, more preferentially from 1 to 6, better still from 1 to 5 carbon atoms, limits included, optionally interrupted by one or more oxygen atom(s), A represents a saturated or partially or completely unsaturated, linear, branched or cyclic, hydrocarbon chain comprising from 1 to 10 carbon atoms, preferably from 1 to 6, more preferably from 1 to 5 carbon atoms, limits included, optionally interrupted by one or more, and preferably one, oxygen atom(s), $X^-$ represents an anion chosen from anions of a halogen atom, such as chlorine, bromine or iodine, a sulfate anion, a sulfonate anion, a methanesulfonate anion, a carbonate anion, a hydrogen carbonate anion, an acetate or propionate anion, and n represents an integer of between 1 and 200, preferably between 1 and 100, more preferably between 1 and 60.

According to a preferred embodiment of the present invention, the polyether b) is a linear or branched polyether represented by the general formula (II) below:

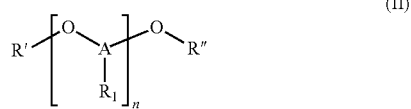

(II)

wherein, $R^1$ is chosen from the hydrogen atom and an alkyl radical comprising from 1 to 6 carbon atoms, preferably from 1 to 4 carbon atoms, preferably the methyl radical and the ethyl radical, R' is as defined above, R" is chosen from:

the hydrogen atom, a saturated or partially or completely unsaturated, linear, branched or cyclic, hydrocarbon chain comprising from 1 to 30 carbon atoms, preferably from 1 to 20, more preferably from 1 to 10 carbon atoms, more preferentially from 1 to 6, better still from 1 to 5 carbon atoms, limits included, optionally interrupted by one or more, and preferably one, oxygen atom(s), and optionally substituted by one or more radicals chosen from —$SR_3$, —$SOR_3$, —$SO_2R_3$, —$SO_3R_3$, —$S^+O_3X^-$, —$S^+R_3R_4X^-$, —$P(=O)R_5R_6$, —$OR_7$, —$C(=O)R_7$, and —$C(=O)OR_7$, A, n, $R_3$, $R_4$, $R_5$, $R_6$, $R_7$ and $X^-$ are as defined above.

According to another embodiment, the polyether b) is a star or hyperbranched polyether comprising more than 2, and for example from 3 to 30, preferably from 3 to 20, more preferentially from 3 to 12 units, more preferably from 3 to 6 units and generally 3 or 4 units z) as defined above. According to one embodiment, the units of formula z) are star-branched on a central core, it being possible for said central core to be of any type known to a person skilled in the art and in particular a carbon atom, it being understood that the units of formula z) can be identical or different in the star or hyperbranched polyether.

When n is strictly greater than 1, it should be understood that the $R_1$ and A radicals can be identical or different, so that the polyether of formula (II) can comprise alternating, block or random sequences.

The polyether can be a homopolymer and can also be a block copolymer, for example composed of two or more blocks, for example chosen from those corresponding to the general formula (II) above. The polyether can also be a statistical copolymer composed of two or more different ether monomers.

Nonlimiting examples of these polyethers are polyoxymethylene glycol, polyethylene glycol or polypropylene glycol. The polyether can also be a polyalkyl ether, and for example a polyglyceride (mono-, di- and/or triglyceride) ether, or also a polycycloalkyl ether, for example polyfuran, polytetrahydrofuran, and others.

Preference is given, among the polyethers b) of formula (II) above, to those for which R' and R", which are identical or different, are chosen, independently of each other, from the hydrogen atom and an alkyl radical comprising from 1 to 4 carbon atoms, preferably the methyl radical and the ethyl radical, preferably the methyl radical.

Preference is given, according to yet another embodiment, among the polyethers b) of formula (II) above, to those for which one of the two R' and R" represents the hydrogen atom and the other represents an alkyl radical comprising from 1 to 4 carbon atoms, preferably the methyl radical and the ethyl radical, preferably the methyl radical.

Examples of polyethers which can advantageously be used in the context of the present invention comprise, as nonlimiting examples, trimethylolpropane triglycidyl ether, neopentyl glycol diglycidyl ether, poly(ethylene glycol) glycidyl ether, poly(propylene glycol) glycidyl ether, poly(ethylene glycol) diglycidyl ether, poly(propylene glycol) diglycidyl ether, poly(ethylene glycol) triglycidyl ether, poly(propylene glycol) triglycidyl ether, poly(ethylene glycol) tetraglycidyl ether, poly(propylene glycol) tetraglycidyl ether, glycerol propoxylate triglycidyl ether, poly(ethylene glycol) methyl ether, poly(ethylene glycol) methyl ether acetate, polyethylene glycol dimethyl ether, polyethylene glycol, polypropylene glycol, polymethylene glycol, polybutylene glycol, polyethylene-block-poly(ethylene glycol), trimethylolpropane ethoxylate, methoxypolyethylene glycol, glycerol ethoxylate, 4-nonylphenyl-polyethylene glycol, glycerol propoxylate, pentaerythritol triacrylate, pentaerythritol propoxylate, pentaerythritol butoxylate, glycerol ethoxylate-co-propoxylate triol, polyalkylene glycol acetic acid, polyalkylene glycol glutaric acid, polyalkylene glycol succinic acid, polyalkylene glycol alkyl ether carboxylic acid, (and, for example, the products sold under the names PMD-7002, PMD-7022 and PMD-7042 available from Creative PEGworks: https://www.creativepegworks.com), star polyethers, for example those sold under the names PSB-480, PSB-483, PSB-466, PSB-469, PSB-4040, PSB-4041, PSB-831, PSB-836, PSB-8021 and PSB-8031 also available from Creative PEGworks, branched, hyperbranched or dendrimeric polyethers, such as, for example, those sold under the names HBP-121, HBP-122, HBP-123, HBP-124, PDP-301, PDP-302, PDP-303, PDP-311, PDP-312 and PDP-313 and available from Creative PEGworks, or polyethers comprising glycidyl groups, such as, for example, those sold by Creative PEGworks under the trade names PLS-280, PLS-279, PLS-278, PLS-277, PSB-281, PSB-282, PSB-2960, PSB-2861, PSB-350, PSB-351, PSB-352, PSB-353, PSB- 354, PSB-355, PSB-356, PSB-470, PSB-471, PSB-473, PSB-475, PSB-871, PSB-872 and PSB 874.

Most of the polyethers that can be used in the context of the present invention are available from Creative PEGworks; other polyethers are also available, for example from Sigma Aldrich.

The total amount of the polyether(s) present in the composition of the invention is generally of between 0.5% and 90% by weight, preferably between 0.5% and 50% by weight, preferably between 1% and 30% by weight and more preferably between 5% and 20% by weight, with respect to the total weight of the composition.

The composition according to the present invention can optionally comprise one or more organic solvents. The organic solvents which can be used are advantageously chosen from alkyl alcohols comprising from 1 to 4 carbon atoms, glycol ethers and mixtures thereof. According to a preferred aspect, the organic solvent used is a glycol or a glycol mixture and very particularly preferably the organic solvent is butyl glycol.

The total amount of organic solvent(s) present in the composition of the invention is generally of between 30% and 90%, preferably between 50% and 90% and more preferably between 60% and 85%, by weight, with respect to the total weight of the composition.

The composition according to the present invention may also comprise one or more other additives commonly used in oil and gas production, for instance those chosen from corrosion inhibitors, top-of-line corrosion inhibitors, kinetic hydrate inhibitors, hydrate anti-agglomerants, mineral deposit inhibitors, demulsifiers, biocides, deoilers, antifoaming agents, paraffin inhibitors and dispersants, asphaltene inhibitors and dispersants, oxygen, hydrogen sulfide or mercaptan scavengers, friction or drag reducers and other colorants, aromas or preservatives, if necessary or if desired.

The composition according to the present invention can be easily prepared, for example by mixing the various components, according to any means well known to a person skilled in the art, in any order, according to the compatibilities and the miscibilities of the components with one another. The compositions can thus be prepared by mixing by means of a stirrer, at ambient temperature and at atmospheric pressure.

It has been observed, entirely surprisingly, that the composition according to the invention makes it possible to prevent, to limit or at the very least to delay by several hours, indeed even by several days, the formation and/or the agglomeration of hydrate crystals, in particular for subcoolings of greater than 10° C. In addition, it has been observed that the composition of use in the context of the present invention often results in a longer induction time than the compositions or products currently available commercially.

A direct consequence is that the composition according to the present invention thus makes it possible to operate at lower temperatures than the current temperatures, while increasing the extraction efficiency and in particular the production output of oil and/or gas.

In addition, it has been discovered that this composition is effective at low concentrations, for example at dosages of between 0.1% and 10% by weight, preferably between 0.2% and 7% by weight, more preferably between 0.2% and 5% by weight and better still between 1% and 4% by weight, with respect to the total weight of the aqueous phase of the fluid liable to form hydrates, and very particularly between 0.2% and 4%, typically between 0.2% and 3%, in particular between 1% and 3%, by weight. The composition according to the present invention is also not very expensive, is easy to produce and is not very toxic.

Thus, and according to another aspect, the present invention relates to a process for preventing, limiting or at the very least delaying, the formation and/or the agglomeration of gas hydrates, comprising a step of adding a composition as defined above to a fluid liable to form hydrates, as described above in this text, and in particular to a production fluid comprising an aqueous phase and one or more gases.

More specifically, the total content of the aqueous phase present in the production fluid is generally of between 10% and 90% by weight, with respect to the total weight of the production fluid, that is to say with respect to the total weight of the fluids (aqueous phase and hydrocarbons). However, the treatment of fluid having a very high content of aqueous phase or containing less than 10% of aqueous phase, indeed even less than 1% of aqueous phase, would not depart from the field of the invention.

The total content of aqueous phase defined above corresponds to the total proportion of aqueous phase initially present in the production fluid, that is to say in the initial mixture (aqueous phase and the other crude extraction liquids, such as hydrocarbons, condensates, and the like).

The aqueous phase of the production fluid additionally comprises one or more dissolved gases liable to form, with water, gas hydrates at a given temperature and a given pressure. Some of the gases present in the aqueous phase of the production fluid are "guest" gases and generally comprise methane, ethane, propane, butane, carbon dioxide, hydrogen sulfide and mixtures thereof.

The composition according to the invention is added in an amount between 0.1% and 10% by weight, preferably between 0.2% and 7% by weight, more preferably between 0.2% and 5% by weight and better still between 1% and 4% by weight, with respect to the total weight of the aqueous phase in a production fluid, and very particularly between 0.2% and 4%, typically between 0.2% and 3%, in particular between 1% and 3%, by weight.

The composition may be introduced into the production fluid continuously, discontinuously, regularly or irregularly, or temporarily, in one or more portions. The composition is generally introduced upstream of the region at risk of the presence of hydrates, whether at the surface, at the well head or at the well bottom.

According to another embodiment of the process of the invention, the fluid treated with the composition according to the invention is a drilling mud or a completion fluid and more generally any fluid extracted from the subsoil. In this embodiment, the composition is introduced into the drilling mud or into the completion fluid, before or during the injection of the drilling mud or of the completion fluid.

According to one embodiment of the invention, the composition, predominantly present in the aqueous phase of the production fluid, can be recycled or regenerated according to any method known to a person skilled in the art and in particular, without being limiting and after separation of the aqueous phase present in the production fluid, by concentration or distillation of said aqueous phase.

Finally, another subject matter of the present invention is the use of a composition as defined above for limiting, delaying, indeed even preventing, the formation and/or the agglomeration of hydrates, preferably in a process for extracting oil and/or gas and/or condensates.

A better understanding of the invention will be obtained in the light of the following examples, which are given for illustrative purposes only and which are not intended to limit the scope of the invention, defined by the appended claims.

EXAMPLES

Example 1

The kinetic effectiveness of different hydrate-inhibiting compositions was tested on a mixture comprising:
- a gas phase, consisting of 98 mol % of methane and 2 mol % of propane; and
- an aqueous phase comprising a 1 g·l$^{-1}$ NaCl solution.

The tests were carried out at a pressure of 135 bar (13.5 MPa), a pressure value which is characteristic of the extraction conditions where a risk of hydrate formation exists. The equilibrium temperature of this mixture at 135 bar (13.5 MPa) is approximately 19.5° C. In other words, at 135 bar (13.5 MPa), the gas hydrates form when the temperature becomes less than or equal to 19.5° C.

The tests are carried out in a mechanically stirred cell temperature-controlled by a jacket. The cell is cylindrical in shape with an internal volume of approximately 292.6 cm$^3$ (149 mm in height for 50 mm in diameter). It is made of steel resistant to 200 bar (20 MPa) and is protected by a valve. The working pressure is provided by an AG-30 gas booster from Haskel. The cell comprises instruments in order to be able to continuously monitor the internal pressure, the stirring torque and the temperature.

In order to carry out the evaluations of the different products, 250 cm$^3$ of aqueous phase containing the additive to be evaluated, or without additive (reference), are first introduced into the cell, under vacuum by suction. After equilibrating the temperature at 19.5° C., the gas mixture is charged, with stirring, to the cell until a stable pressure of 135 bar (13.5 MPa) is obtained.

The assembly is subsequently heated to and maintained at 30° C. for 24 hours in order to erase the thermal history of the mixture and is then brought down, at the rate of 0.2° C./min, to the temperature corresponding to the targeted sub-cooling (in this instance 8.5° C. and 4.5° C. for respective sub-coolings of 11° C. and 15° C.).

The kinetic effectiveness of the hydrate-inhibiting compositions is measured at different sub-coolings (11° C. and 15° C.) but also at different dosages. The dosage corresponds in this instance to the amount (weight) of hydrate-inhibiting composition introduced into the aqueous phase, with respect to the weight of the water.

The kinetic performance of the hydrate-inhibiting compositions is determined by the measurement of the delay time to the formation of the hydrate crystals. This time, also known as induction time, is expressed in hours or in days. In other words, the longer the induction time, the more effective the hydrate inhibitor.

In this instance, this time is measured from the moment when the temperature in the cell reaches the target temperature of the test corresponding to the sub-cooling studied (8.5° C. and 4.5° C. for respective sub-coolings of 11° C. and 15° C.) and the pressure in the cell has stabilized. The final point for measuring the induction time corresponds to the start of formation of the hydrates. It is located on the curve of pressure as a function of the time by the point where the pressure begins to fall in the cell (fall in pressure corresponding to the consumption of gas in order to form solid hydrates) and confirmed by an increase in the torque of the stirrer (viscosification of the medium, which becomes loaded with solid) and possibly a very slight exothermic peak on the temperature curve.

The composition A, according to the invention, and the comparative compositions B and C were prepared by mixing the different components, the amounts of which are expressed in Table 1 below.

Unless otherwise indicated, all the amounts are shown as percentage by weight, with respect to the total weight of the composition.

TABLE 1

| | Composition A (invention) | Composition B (comparative) | Composition C (comparative) |
|---|---|---|---|
| PVP/PVCap 1:1[a] | 20% | 30% | — |
| PPG 400[b] | 10% | — | 30% |
| 2-Butoxyethanol | 70% | 70% | 70% |

[a]Vinylpyrrolidone (VP)/Vinylcaprolactam (Vcap) 1:1 copolymer.
[b]Polypropylene glycol with a molecular weight of 400 g · mol$^{-1}$.

The kinetic effectiveness of the hydrate-inhibiting compositions, for a sub-cooling of 11° C., is evaluated for a dosage of 1% by weight for each of the compositions A (invention) and B and C (comparative). Each of the test compositions is introduced into the aqueous phase and the experiment is carried out as described above.

The kinetic performance of these compositions, characterized by the induction time, was measured twice, and the mean of these measurements is expressed in Table 2 below.

TABLE 2

| Results for a sub-cooling of 11° C. | | | |
|---|---|---|---|
| | Composition A (invention) | Composition B (comparative) | Composition C (comparative) |
| Induction time Dose = 1% | 168 hours | 72 hours | 30 hours |

The above results show that, for a sub-cooling of 11° C., the compositions of the present invention are more effective than the comparative compositions. This is because, in the composition according to the present invention where, when the vinylcaprolactam/vinylpyrrolidone copolymer is in a mixture with a polyether (composition A), 168 hours (for a dosage of 1% by weight) are needed to see the appearance of gas hydrates.

By way of comparison, the composition C, which comprises only the solvent and the same polyether, delays the appearance of the hydrates by only 30 hours. The composition B, comprising only the solvent and the same copolymer, makes it possible to delay their formation by only 72 hours.

The same tests are subsequently carried out for a greater sub-cooling, now of 15° C. Each of the compositions A (invention) and B and C (comparative) is evaluated, according to the protocol described above, for a dose of 1% of each of the compositions A (invention) and B and C (comparative).

The kinetic performance of these compositions was measured twice, and the mean of these measurements is expressed in the table below.

TABLE 3

Results for a sub-cooling of 15° C.

|  | Composition A (invention) | Composition B (comparative) | Composition C (comparative) |
|---|---|---|---|
| Induction time Dose = 1% | 6 hours | 3 hours | 0.75 hours |

These results lead to similar conclusions. At a dosage of 1% by weight, the comparative composition B delays the formation of gas hydrates by only 3 hours, whereas the composition according to the invention (composition A) delays this formation by 6 hours.

An advantage is thus clearly established with respect to the prior art, in that the composition according to the present invention results in a longer induction time for greater sub-coolings (15° C.) than that observed with the compositions of the prior art. It is thus possible to work at lower temperatures than the current temperatures while increasing the production output of oil and/or gas.

Example 2

The objective of the measurement of the cloud point temperature is to determine if the hydrate-inhibiting composition can be injected into the line transporting the fluids (water, gas, condensate, oil) when they are still hot, without causing deposition or the risk of blockage.

The composition D, according to the invention, and the comparative composition E (in accordance with the teaching of Patent CN104357034) were prepared by mixing the different components, the amounts of which are expressed in Table 4.

Unless otherwise indicated, all the amounts are shown as percentage by weight, with respect to the total weight of the composition.

TABLE 4

|  | Composition D (invention) | Composition E (comparative) |
|---|---|---|
| PVP/PVCap 1:1[a] | 66% | — |
| PVCap[b] | — | 20% |
| PVP 10K[c] | — | 40% |
| PPG 400[d] | 33% | 40% |

[a]Vinylpyrrolidone (VP)/vinylcaprolactam (Vcap) 1:1 copolymer.
[b]Vinylcaprolactam polymer.
[c]Vinylpyrrolidone polymer with a molecular weight of 10 000 g · mol$^{-1}$.
[d]Polypropylene glycol with a molecular weight of 400 g · mol$^{-1}$.

Two aqueous solutions having 1 g and 30 g of sodium chloride (NaCl) per liter are prepared at 20° C. Starting from these solutions, for each composition D and E, 1% by weight solutions in solutions having 1 g and 30 g of NaCl per liter are prepared in test tubes. The kinetic hydrate inhibitor solutions are placed in a thermostatically controlled chamber and the temperature is increased in stationary phases of 5° C. starting from 20° C. For each stationary phase, the temperature is kept constant for 1 h. At 20° C., all the solutions are clear.

The cloud point is determined visually when a cloudiness appears in the solution and is expressed in Table 5 below.

TABLE 5

|  | Composition D (invention) | | Composition E (comparative) | |
|---|---|---|---|---|
| Salinity of the solution | 1 g · l$^{-1}$ | 30 g · l$^{-1}$ | 1 g · l$^{-1}$ | 30 g · l$^{-1}$ |
| Cloud point (° C.) | 75° C. | 70° C. | 45° C. | 40° C. |

It clearly emerges from these measurements that the composition according to the present invention exhibits a higher cloud point than the composition according to the prior art. The composition according to the present invention can thus be injected into the line transporting the fluids (water, gas, condensate, oil) at higher temperatures than the current temperatures, which represents a major industrial advantage.

Example 3

The objective of the measurement of the foaming power is to determine if the hydrate-inhibiting composition can be injected into the line transporting the fluids (water, gas, oil, condensate) without interfering with or while interfering to a limited extent with the downstream operations for treatment of the fluids. This is because these operations comprise in particular one or more stages of gas/liquid separation, which stage can be rendered difficult to carry out in the event of excessive foaming, it being possible for more or less large amounts of liquid to be entrained with the gas.

The foaming power of the composition is determined by comparing the compositions D and E of the preceding example, which were mixed beforehand with 2-butoxyethanol (70% of solvent and 30% of formulation). 100 ml of an aqueous solution having 1 g of NaCl per liter are prepared, which are introduced into a 1 liter graduated measuring cylinder.

The solution is sparged with molecular nitrogen introduced by a sintered glass of porosity 2 at a flow rate of 2.8 l·min$^{-1}$ at 20° C. 1% by weight, with respect to the weight of water, of the solvent-containing composition to be tested is then rapidly introduced into the measuring cylinder and the sparging is maintained for 2 minutes. With the composition of the invention (D), the formation of 100 ml of foam is observed during the 2 minutes of sparging, then this foam disappears in 3 seconds. With the comparative composition (E), more than 900 ml of foam are formed in 20 seconds, then disappear in 30 seconds after the halting of the sparging.

An advantage with respect to the prior art is thus clearly established, in that the composition according to the present invention exhibits a lower foaming power during its injection into the line transporting the fluids water, gas, condensate, oil.

Example 4

The kinetic effectiveness of different hydrate-inhibiting compositions was tested on mixtures according to the same procedure described in detail in Example 1.

The kinetic effectiveness of different hydrate-inhibiting compositions was tested on a mixture comprising:
  a gas phase, consisting of 98 mol % of methane and 2 mol % of propane, and
  an aqueous phase comprising a 1 g·l$^{-1}$ NaCl solution.

The tests were carried out at a pressure of 129 bar (12.9 MPa) at 30° C., a pressure value which is characteristic of the extraction conditions where a risk of hydrate formation exists.

The assembly is subsequently heated to and maintained at 30° C. for 24 hours in order to erase the thermal history of the mixture and is then brought down, at the rate of 0.2° C.·min$^{-1}$, to the temperature corresponding to the targeted sub-cooling (10° C., 11° C., 13° C., 14° C. and 15° C.).

The assembly is first maintained at the sub-cooling 10° C. for 72 hours. If, at the end of the time on this temperature stationary phase, the hydrate has not formed, then the temperature is brought down to 11° C. of sub-cooling and maintained for 24 hours. If, at the end of 24 hours, the hydrate has not formed, then the assembly is brought down to 13° C. for 24 hours, then to 14° C. of sub-cooling for 24 hours and finally to 15° C. of sub-cooling, and so on, until the hydrate is formed.

The compositions F and G according to the invention were prepared by mixing the different components, the amounts of which are expressed in Table 6 below, in which, and unless otherwise indicated, all the amounts are shown as percentage by weight, with respect to the total weight of the composition.

TABLE 6

|  | Composition F (invention) | Composition G (invention) |
|---|---|---|
| PVP/PVCap 1:1[a] | 20% | 20% |
| PTHF 250[b] | 10% | — |
| POM[c] | — | 10% |
| 2-Butoxyethanol | 70% | 70% |

[a]Vinylpyrrolidone (VP)/vinylcaprolactam (Vcap) 1:1 copolymer.
[b]Polytetrahydrofuran with a molecular weight of 250 g · mol$^{-1}$.
[c]Polymethylene glycol.

The kinetic effectiveness of the hydrate-inhibiting compositions is evaluated for a dosage of 1% by weight for each of the compositions F and G. Each of the compositions to be tested is introduced into the aqueous phase and the experiment is carried out as described above.

For each sub-cooling, the kinetic performance of these compositions is expressed in Table 7 below, characterized by the induction time. The induction time corresponds to the time which the hydrate takes to form once the desired sub-cooling stationary phase is reached. If the hydrate has not formed during the time for which the system is maintained at a stationary phase, then the comment "no hydrate formation" appears in Table 7.

TABLE 7

| Dose = 1% by weight | Composition F | Composition G |
|---|---|---|
| 10° C. of sub-cooling (stationary phase of 72 hours) | No hydrate formation | No hydrate formation |
| 11° C. of sub-cooling (stationary phase of 24 hours) | No hydrate formation | No hydrate formation |
| 13° C. of sub-cooling (stationary phase of 24 hours) | No hydrate formation | Formation after 5 hours |
| 14° C. of sub-cooling (stationary phase of 24 hours) | Formation after 13 hours | — |

At a dosage of 1% by weight, the compositions F and G according to the present invention delay the formation of gas hydrates at 10° C. and 11° C. respectively by at least 72 hours and 24 hours. The composition F delays the formation of gas hydrates at 14° C. of sub-cooling by 13 hours and the composition G delays by 5 hours the formation of gas hydrates at 13° C. of sub-cooling.

The invention claimed is:

1. A composition comprising:
   a) between 5% and 40% by weight with respect to the total weight of the composition of at least one copolymer obtained by polymerization of vinylpyrrolidone (VP) and vinylcaprolactam (VCap);
   b) between 1% and 30% by weight, with respect to the total weight of the composition of at least one polyether with a weight-average molecular weight (Mw) of greater than 260 g.mol$^{-1}$ that is chosen from among polyoxymethylene glycol, polymethylene glycol, polyethylene glycol, polypropylene glycol, polybutylène glycol, trimethylolpropane triglycidyl ether, neopentyl glycol diglycidyl ether, poly (ethylene glycol) glycidyl ether, poly (propylene glycol) glycidyl ether, poly (ethylene glycol) diglycidyl ether, poly (propylene glycol) diglycidyl ether, poly (ethylene glycol) triglycidyl ether, poly (propylene glycol) triglycidyl ether, poly (ethylene glycol) tetraglycidyl ether, poly (propylene glycol) tetraglycidyl ether, glycerol propoxylate triglycidyl ether, poly (ethylene glycol) methyl ether, poly (ethylene glycol) methyl ether acetate, polyethylene glycol dimethyl ether, le trimethylolpropane ethoxylate, methoxypolyethylene glycol, glycerolèthoxylate, 4-nonylphenyl-polyethylene glycol, glycerol propoxylate, pentaerythritol triacrylate, pentaerythritol propoxylate, and pentaerythritol butoxylate, and
   c) optionally at least one organic solvent.

2. The composition as claimed in claim 1, wherein the at least one organic solvent is an alkyl alcohol comprising from 1 to 4 carbon atoms, a glycol ether or mixtures thereof.

3. A process for preventing, limiting or delaying formation and/or agglomeration of gas hydrates, comprising a step of adding the composition as defined in claim 1 to a mixture having a composition capable of forming hydrates.

4. The process as claimed in claim 3, wherein the composition of claim 1 is added in an amount between 0.1% and 10% by weight, with respect to the total weight of an aqueous phase of a fluid capable of forming hydrates.

5. The process as claimed in claim 4, wherein the composition is introduced into the fluid continuously, discontinuously, regularly or irregularly, or temporarily, in one or more portions.

6. The process as claimed in claim 4, wherein the fluid treated with the composition is a drilling mud or a completion fluid or a fluid extracted from the subsoil.

7. The composition as claimed in claim 1, wherein the VCap/VP ratio by weight is between 75/25 and 50/50.

8. The composition as claimed in claim 1, wherein the VCap/VP ratio by weight is between 60/40 and 50/50.

9. The composition as claimed in claim 1, wherein the at least one organic solvent is present.

10. The composition as claimed in claim 9, wherein the at least one organic solvent is chosen from alkyl alcohols comprising from 1 to 4 carbon atoms, glycol ethers and mixtures thereof.

* * * * *

UNITED STATES PATENT AND TRADEMARK OFFICE
CERTIFICATE OF CORRECTION

| | |
|---|---|
| PATENT NO. | : 12,180,417 B2 |
| APPLICATION NO. | : 17/288775 |
| DATED | : December 31, 2024 |
| INVENTOR(S) | : Gilles Barreto and Henry Delroisse |

Page 1 of 2

It is certified that error appears in the above-identified patent and that said Letters Patent is hereby corrected as shown below:

On the Title Page

Item (72) Inventors: the word "Lyons" should read -- Lyon --.

Item (56) "WO 2016202677 A1" should read -- WO 2016202577 A1 --.

In the Claims

In Column 18, Line 15 in Claim 1: "(Mw)" should read -- ($M_W$) --.

In Column 18, Line 18 in Claim 1: "polybutyle nè" should read -- polybutylene --.

In Column 18, Line 20 in Claim 1: "poly (ethylene glycol)" should read -- poly(ethylene glycol) --.

In Column 18, Line 21 in Claim 1: "poly (propylene glycol)" should read -- poly(propylene glycol)" --.

In Column 18, Line 21-22 in Claim 1: "poly (ethylene glycol)" should read -- poly(ethylene glycol) --.

In Column 18, Line 22 in Claim 1: "poly (propylene glycol)" should read -- poly(propylene glycol) --.

In Column 18, Line 23 in Claim 1: "poly (ethylene glycol)" should read -- poly(ethylene glycol) --.

In Column 18, Line 24 in Claim 1: "poly (propylene glycol)" should read -- poly(propylene glycol) --.

In Column 18, Line 24-25 in Claim 1: "poly (ethylene glycol)" should read -- poly(ethylene glycol) --.

In Column 18, Line 25-26 in Claim 1: "poly (propylene glycol)" should read -- poly(propylene glycol) --.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,180,417 B2

In Column 18, Line 27 in Claim 1: "poly (ethylene glycol)" should read -- poly(ethylene glycol) --.

In Column 18, Line 27-28 in Claim 1: "poly (ethylene glycol)" should read -- poly(ethylene glycol) --.

In Column 18, Line 29 in Claim 1: "le trimethylolpropane" should read -- trimethylolpropane --.

In Column 18, Line 30 in Claim 1: "glycerolèthoxylate," should read -- glycerol ethoxylate, --.